United States Patent [19]

Colonel et al.

[11] Patent Number: 4,765,412
[45] Date of Patent: Aug. 23, 1988

[54] SHOCK RELIEVING HORSESHOE

[76] Inventors: Richard C. Colonel, Box 2192, Renton, Wash. 98056; DeVere V. Lindh, 1910 Dogwood Dr. SE., Auburn, Wash. 98002

[21] Appl. No.: 10,552

[22] Filed: Feb. 3, 1987

[51] Int. Cl.⁴ ............................................. A01L 7/02
[52] U.S. Cl. ........................................ 168/15; 168/11; 168/12
[58] Field of Search ........................ 168/4, 11, 12, 15

[56] References Cited

U.S. PATENT DOCUMENTS

| | | | |
|---|---|---|---|
| 3,180,421 | 4/1965 | Hirshberg et al. | 168/12 |
| 3,747,684 | 7/1973 | Wallen | 168/4 |
| 4,333,532 | 6/1982 | Mennick | 168/24 |
| 4,420,046 | 12/1983 | Choplin | 168/14 |
| 4,496,002 | 1/1985 | Jones et al. | 168/4 |
| 4,557,334 | 12/1985 | Cattaneo | 168/12 |

FOREIGN PATENT DOCUMENTS

| | | | |
|---|---|---|---|
| 3024366 | 1/1981 | Fed. Rep. of Germany | 168/11 |
| 2538220 | 6/1984 | France | 168/12 |

Primary Examiner—Robert P. Swiatek
Assistant Examiner—Michael Lynch
Attorney, Agent, or Firm—Robert W. Jenny

[57] ABSTRACT

A horseshoe made of resilient material having a low modulus of elasticity, low density and an allowable working stress in the range of 15,000 to 22,000 PSI. The configuration of the spring, in combination with these properties, provides a working deflection in the range of 0.3 to 0.5 of an inch under a load of 2000 pounds, i.e. a spring rate of 5000 pounds per inch, and weighing in the range of 8 to 10 ounces. The purpose of the resilience is to relieve shock loads in horses' hooves and, on a corollary basis, improve the performance of the horse. The horseshoe is a single piece having a horseshoe shaped flange to be attached to the horse's hoof, a second horseshoe shaped flange which contacts the terrain and a curved channel interconnecting the two flanges, spaced apart and parallel to each other. Protrusions on the flanges limit deflection of the flanges toward each other to keep the stresses in the spring well within the allowable range. The second flange has cutouts which provide clearance for the tools and fasteners used to attach the shoe to the hoof. A wear plate can be attached to the second flange to augment the durability and function of the shoe. The wear plate incorporates protrusions which fill in the access cutouts in the flange.

16 Claims, 2 Drawing Sheets

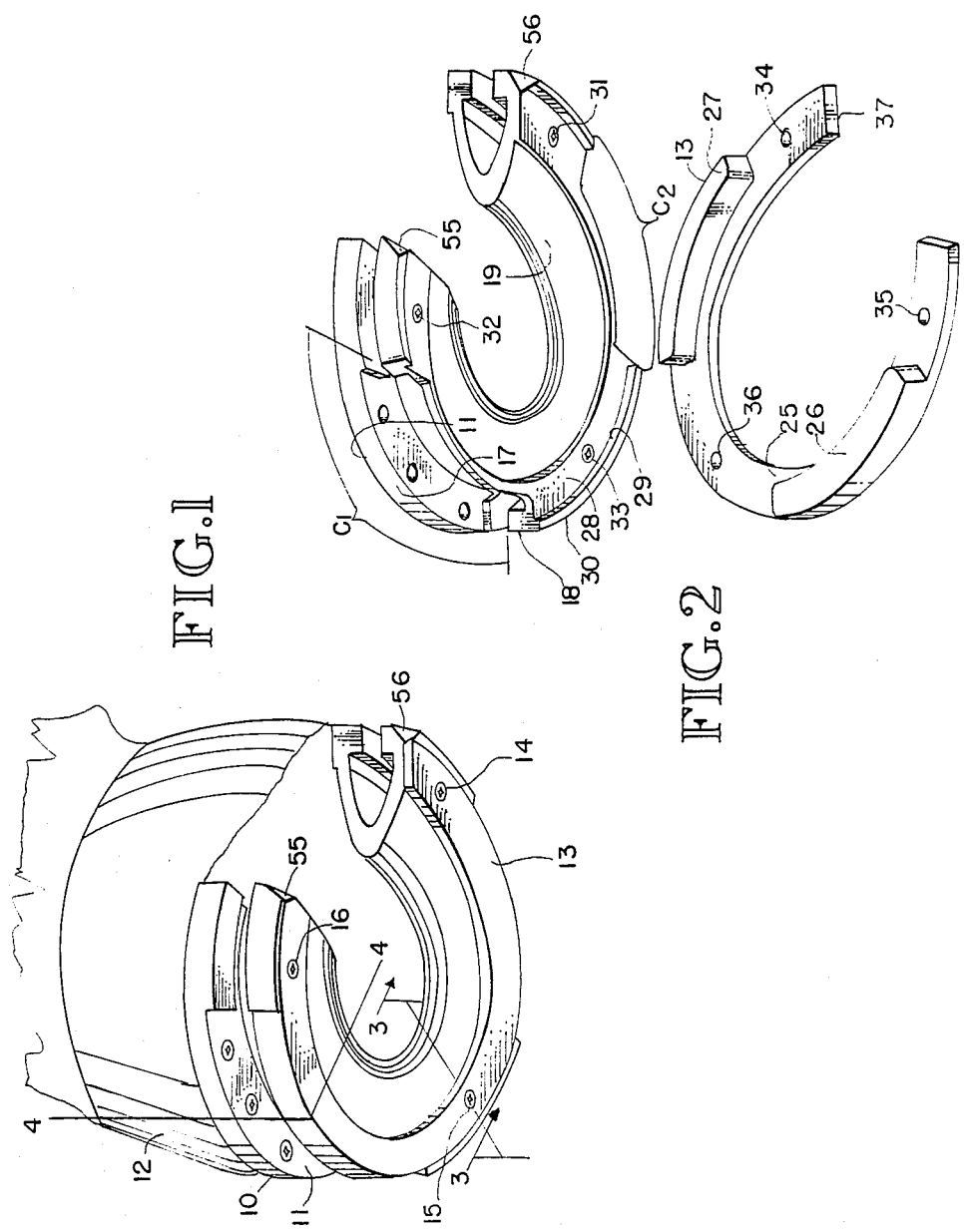

SHOCK RELIEVING HORSESHOE

BACKGROUND OF THE INVENTION

The subject invention is in the field of apparatus for protecting horses hooves and for avoiding or ameliorating harm done to the hooves and other parts of the animal by contacts of the hooves on terrain. On a corollary basis, the invention is in the field of hoofwear provided for the purpose of improving performance of horses in terms of running speed, jumping capability and the like.

2. Prior Art

Prior art in this field includes that shown in U.S. Pat. Nos. 3,921,721, 4,189,004, 4,206,811, 4,299,288, 4,333,532, 4,420,046, 4,496,002.

Also, in the book entitled "The World Almanac Book of Inventions by Valerie-Anne Giscard d'Estaing, distributed in the United States by Ballantine Books, on page 139 there is an illustration of a horse fitted with air-cushioned shoes, said to enable the horse to jump even on very hard pavement.

U.S. Pat. No. 4,496,002 covers a horseshoe made of ultra-high molecular weight polyethylene plastic. This patent clearly documents the relationship between lameness in horse's legs and the shocks applied to them by the horse's hooves, citing as a reference "Foreleg Fatigue Fracture," Cheney, J. A.; Lion, S. Y.; Shen, C. K. and Wheat, J. D., Thoroughbred of Calif., Nov. 1971.

The horseshoe of U.S. Pat. No. 4,496,002 provides some shock relief because of the material from which it is made. It also offers relief by not restricting the natural action of the hoof. It is well known that the natural action reduces the shocks and the lameness attributed to them. This patent cites a comprehensive study of the structure and behavior of horses' feet in action, to be found in the Aug. 1977 issue of Saddle Action, published by Saddle Action, Inc., Paso Robles, Calif., pages 18–21, 50, written by K. D. Butler, Jr. It is stated in the patent that in order for the hoof to function optimally as an absorber, the lower surface of the hoof should have a specific contour. It can be concluded that the proper contour would be produced by normal wear of an unshod hoof of a feral animal.

U.S. Pat. No. 4,333,532 covers a horseshoe devised specifically to facilitate the natural shock absorbing characteristics of horse's hooves, while providing protection and traction for the hooves.

It is well known that in any instance in which a shock is absorbed the energy involved is either converted to heat or stored by some form of energy storage apparatus or some combination of the two. Stored energy is returned and may do useful work when and if the force involved in the action is decreased. Energy converted to heat constitutes a loss of some of the energy being expended for whatever purpose and tends to defeat the purpose of the energy expenditure. In the case of a horse, the energy loss can be manifested in the form of decreased stamina (increased fatigue).

In view of the above discussion it can be concluded that there is a long standing need to shoe horses with apparatus which minimizes, as much as possible by shock relief, the tendency for contacts of the hooves with terrain to produce lameness and other ill effects. At the same time, there are advantages to be gained if the shock relief is accomplished with minimal associated effects such as decrease in stamina due to lost energy. Therefore it is a prime objective of the subject invention to provide hoof wear for a horse which efficiently relieves the shocks on horse's hooves fitted with the hoof wear, the efficiency deriving from the characteristic that the hoof wear stores and returns considerably more of the energy than it converts to heat. Since the efficiency of the natural shock relief of horses' hooves is not generally known and may not be high, it is a further objective of the subject invention to provide efficient shock relief without significant dependence on the hoof's natural shock relief characteristics but without interfering with the natural shock relief to any significant degree. Further objectives are that the hoof wear, which may be termed a horseshoe, have a weight which is in the range of weights for more conventional horseshoes and be fittable and attachable using well known farrier apparatus and techniques. It is a specific objective that the horseshoe weigh no more than 16 ounces and preferably less than 10 ounces. Further, it is an objective that the shoe be no higher than 1.75 inches with a height of less than 1.5 inches preferred. Another objective is that the horseshoe not be adversely affected by use in mud, gravel and the like. Still further objectives are that the horseshoe be durable by conventional standards and suitably economical to manufacture and use.

SUMMARY OF THE INVENTION

The subject horseshoe, in a preferred embodiment, comprises two parts. Both are generally horseshoe shaped. The primary part is a spring. The other part is a wear plate. The primary part is attached to the hoof using apparatus and techniques known in the art. The wear plate is attached to the underside of the primary part.

The primary part further comprises an upper, horseshoe shaped flange which is attachable to the hoof and a lower horseshoe shaped flange, to which the wear plate is attached. The two flanges are integrally interconnected by a curved channel having an essentially V shaped cross-section. One leg of the V is integrated with the top flange, the other with the bottom flange. The plane bisecting the channel is parallel to the flanges. The open part of the V shaped cross-section is toward the rims of the flanges and the closed portion faces away from the rims and its innermost extremes form the inner shape of the horseshoe configuration of the part.

The material is resilient and the flanges can be moved toward each other by applying force to flex the flanges and leg portions of the spring closer together. The movement of the flanges toward each other, i.e. the compression of the spring, is limited by contact between rims, one on each flange. The rim on the upper flange extends downward from the lower surface of the flange and the rim on the lower flange extends upward from the upper surface of the flange. The radial widths of the rims are about one-half the widths of the flanges and the outer edges of the rims and flanges are congruent.

Parts of the lower flange and associated rim are cut away to allow access to the upper flanges for the purpose of attaching it to a hoof using state of the art fastenings in state of the art locations. The rim on the upper flange is cut away to match the cutaway of the rim on the lower flange. The lower flange is recessed over its lower surface except for a narrow rim at its outer edge to receive and locate the wear plate. The wear plate has extensions on its upper surface which fit into the cut away portions of the lower flange of the spring and essentially replace the cut out portions of the lower flange. The wear plate is attached to the lower flange with threaded fasteners of types well known in the art.

It can be understood from the description thus far that the lower flange can be deflected relative to the upper flange in three degrees of freedom: movement of the flanges toward and away from each other while remaining parallel to each other; rotation from side-to-side and rotation fore and aft. The relative motion can obviously be combinations of the three. Also the horseshoe can flex in the elevational view, with the ends of the flanges flexing toward and away from each other. This flexing facilitates the natural shock relieving action of the hoof.

The weight of the horseshoe, its height and its energy absorption and release capacity relative to the built in deflection capabilities are functions of the characteristics of the material from which the spring is made and the details of its design. The material selection is of primary importance and the design details are dependent in good part on the material characteristics and the desired energy capacity. In a preferred embodiment the maximum deflection is geometrically limited to 0.4 an inch, in the range of 0.3 to 0.6 inches. The design load at full, limited deflection is 2000 pounds, within the range of 1000 to 2500 pounds. As a hoof contacts the terrain a mass to be supported by the hoof, including the masses of the hoof and leg, will be rapidly decelerated and the force experienced by the hoof comprises the force required to decelerate the mass and other forces related to supporting and/or propelling the horse. If the deceleration occurs during the time it takes for the horseshoe to compress 0.4 of an inch, then the maximum load on the hoof will be no more than 2000 pounds. Without the shoe and on relatively hard terrain, even with the natural shock absorption characteristics of the hoof, some parts of the hoof and leg would quite likely be subjected to impact forces well in excess of 2000 pounds, recognizing that, theoretically, a mass decelerated instantly is subjected to an infinite force.

In further regard to material selection for a spring in which the material is primarily subjected to bending stress to have an optimum ratio of energy capacity to weight and size, the material should have a low modulus of elasticity (unit stress/unit strain) and a low density and a desirable ratio of its allowable working stress to its modulus of elasticity. The allowable working stress is the highest stress to which the material can be repeatedly subjected in bending with essentially no chance of fatigue failure. The low coefficient of elasticity makes it possible for the spring of given proportions to deflect more under a given load than a similar spring made of material with a higher coefficient of elasticity. A material having this deflection capability, in combination with low density, makes it possible to manufacture the subject horseshoe with a weight in the weight range of conventional horseshoes. It is necessary, obviously, that the material have an adequate strength, along with the low modulus of elasticity and low density. The ratios of allowable working stress to modulus of elasiticity and density provide a convenient basis for comparison of materials in terms of weight and strength. The material used in the subject spring should have ratios in the range of or better than those for steel.

An acetal plastic material with the described characteristics is commercially available under the name Delrin. This material has a modulus of elasticity of 350,000 PSI. Its working stress is 17,000 PSI in bending, within the range of 15,000 to 22,000 PSI for such materials, and its density is 0.05 pounds per cubic inch. The modulus of elasticity of steel is $30 \times 10^6$. The non-fatigue, working stress in bending for steel is about 100,000 PSI and the density of steel is 0.286 pounds per cubic inch. Accordingly, the working stress to density for steel is $100,000/0.286 = 349,650$ and for Delrin it is $17,000/0.05 = 340,000$. For steel the ratio of working stress to modulus of elasticity, assuming an allowable working stress as high as 160,000 PSI, is 0.0053. For Delrin the ratio is 0.049 or about 10 times that for steel. These values indictate that materials like Delrin have adequate strength for the subject purposes. A spring of the design used in the subject shoe and made of Delrin weighs approximately one-third as much as a spring of similar design but configured to be made of steel. Springs made of materials having a low modulus of elasticity and low density comprise thicker sections and more bulk in general than similar springs made of steels of various kinds. The extra bulk is advantageous in that the springs are more robust and inherently more stable structurally and less sensitive to dimensional tolerances. Further, materials such as Delrin are known to have excellent resistance to fatigue failures, i.e. failures caused by repeated loadings. Also such materials are not subject to corrosion.

To effectively reduce the chances for damage to the horseshoe by gravel, mud and the like, the gap between the upper and lower flanges is covered by an elastomeric shield and/or the cavity between the legs of the spring is filled with elastomeric, closed cell foam.

In summary, the subject invention comprises a spring as described, made of a material having the characteristics noted as desired, in combination with a wear plate. It can be understood from this description that the invention meets its objectives. The spring significantly relieves shock loads to the horse's hooves. It accommodates but does not depend on the natural shock relief characteristics of horse's hooves. Its weight is in the range of acceptable weight for horseshoes and close to the desired 10 ounces. It has been determined that shoes no higher than 1.5 inches have acceptable energy storage and release capacity. The foam inserts prevent adverse effects of mud, gravel and the like. It is fitted and attached in the same manner as conventional horseshoes. It is durable and economical to manufacture, in part because of the nature of the spring material used, and in part because of the details of the design.

BRIEF DESCRIPTION OF THE DRAWINGS

FIG. 1 is a perspective illustration of the subject horseshoe in place on a horse's hoof and viewed from below.

FIG. 2 is an exploded perspective view of the horseshoe.

DETAILED DESCRIPTION OF THE INVENTION

Figure 3:
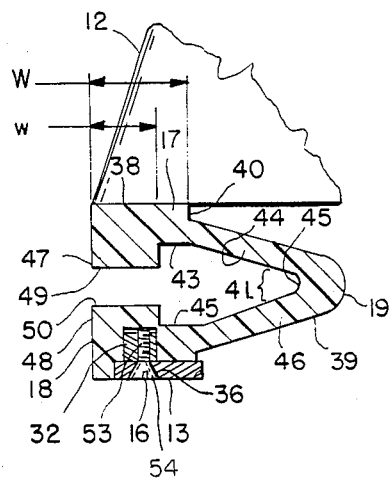
FIG. 3 is a sectional view of the horseshoe taken at 3—3 in FIG. 1.

Referring to FIG. 1, the subject horseshoe assembly 10, referred to hereinafter as the subject horseshoe, comprises spring element 11 attached to hoof 12 and wear plate 13 attached to the spring by countersunk screws 14, 15 and 16.

Referring to FIG. 2, the spring is an integral part further comprising an upper flange portion 17 which is attachable to the horse's hoof as described below, a lower flange portion 18 to which the wear plate is attached and a channel portion 19 interconnecting the two flanges. As shown, the flanges and channel portion are all horseshoe shaped in elevation view.

Figure 4:
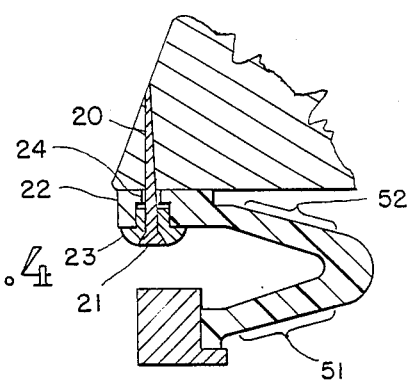
FIG. 4 is a sectional view of the horseshoe taken at 4—4 in FIG. 1.

There are cutouts $C_1$ and $C_2$, indicated by the brackets so labeled, in the lower flange to provide clearance for tools and fasteners used in fastening the upper flange to the hoof. Referring to FIG. 4 the upper flange is fastened to the hoof by a plurality of conventional horseshoe nails, of which nail 20 is typical. The heads of the nails, of which head 21 is typical, come to rest in countersunk holes in bushings inserted in holes in the flange, countersunk hole 22, bushing 23 and hole 24 all being typical. In the usual manner for attaching a shoe, the flange is positioned against the flattened bottom of the hoof and fastened in place by the nails.

Referring again to FIG. 2, the wear plate has, on its upper surface 25, protrusions 26 and 27 which are sized, shaped and located to fit into and essentially fill cutouts $C_1$ and $C_2$ respectively when the wear plate is positioned on the lower flange. The lower surface 28 of the lower flange is recessed, leaving ridge 29 along rim 30 of the flange. Internally threaded parts 31, 32 and 33 are molded in place or inserted into the lower flange to receive screws 14, 15 and 16 which fit through holes 34, 35 and 36 in the wear plate to fasten it to the lower flange. The edge of the wear plate nests against ridge 29 and the lower surface 37 of the wear plate is essentially coplanar with the lower surface of the flange.

The cross-sectional shape of the curved channel portion 19 is continuous throughout and is shown sectioned in FIG. 3. The upper flange portion 17 is in contact with the hoof 12 shown and the upper surface 38 is flat to contact uniformly the flattened bottom of the hoof. The outside surface 39 of the channel portion is a modified U shape from flange to flange. At the junction of this shape and the upper flange there is a step 40. This step serves to provide working clearance between the channel and the bottom of the hoof.

The shape of the inside of the channel portion comprises a V shaped portion 41 with a radius at the point 45 of the V with the lower surface 43 of the upper flange extending from leg 44 of the V shape and the upper surface 45 of the lower flange extending from leg 46 of the V shape. Surfaces 43 and 45 are parallel to each other. Rimlike protrusion 47 extends downward from surface 43 and a similar protrusion 48 extends upward from surface 45. Width w of the protrusions is about half of width W of the flanges. When force is applied to the spring, such as when it is compressed between the hoof and terrain, the flanges are deflected closer together and the amount of the deflection is limited by contact between protrusion surfaces 49 and 50. Protrusion 47 does not extend over the periphery of the upper flange opposite the cutouts in the lower flange. The modified U shape of the exterior of the channel and the V shaped portion of the interior are sized, shaped and oriented so that the walls 51 and 52 of the channel are tapered from the base of the V shape to the junctures of the walls with the flanges.

The wear plate 13 is attached to the lower flange portion 18 with a plurality of threaded fastenings, one of which is shown in FIG. 3. Insert 32 with threaded hole 53 running through it on its longitudinal axis, is molded or threaded into the flange. Screw 16 passes through hole 36 in the wear plate and engages the threads in insert 32 so that head 54 on screw 16 holds the plate to the flange.

As shown in FIGS. 1 and 2, chamfers 55 and 56 on the aft, lower corners of the lower flange reduce chances of damage to the flange caused by its digging into terrain.

The spring allows three degrees of freedom of motion between the flanges. They can move to and from each other while remaining parallel. They may rotate fore and aft until the rims come into contact at their most forward or aft points of contact and they may rotate from side-to-side about a fore and aft axis until the rims come into contact at one side of the shoe or the other. Deflection obviously can combine two or three of the degrees of motion. Also the ends of the shoe at its open extremity can flex toward and away from each other to facilitate the natural shock relieving action of the hoof.

Design of a spring of suitable size, weight and energy capacity requires a material having a particular combination of characteristics, specifically density, modulus of elasticity and allowable working stress. A low modulus provides a desirable ratio of working deflection relative to size of the spring. The low density enables favorable ratios of section thickness to spring weight. The greater section thicknesses put the fibres which work in bending at greater distances from the neutral axes, enabling bending loads to be achieved with lower fibre stresses. In turn, the low modulus of elasticity enables adequate deflection even though the working fibres are relatively distant from the neutral axes and have, therefore, favorable mechanical advantage.

It is necessary that the material have, in addition to low modulus of elasticity and density and adequate strength, satisfactorily low internal damping, good resistance to fatigue failure and resistance to corrosion. One commercially available material having the necessary properties is called Delrin, a registered trademark name. Delrin, an acetal plastic, has a modulus of elasticity of 350,000 PSI, a density of 0.05 pounds per cubic inch and a safe working stress capability in bending of 17,000 pounds per square inch (PSI), within the 15,000 to 22,000 PSI range for such materials.

The adequacy of the working strength of materials like Delrin is evidenced by their having working stress to density ratios in the same range as that of steel. The ratio for Delrin is $17,000/0.05 = 340,000$ and that for steel is $100,000/0.286 = 349,650$. 100,000 PSI is a typical working stress for heat treated steel subjected to repeated loads of the type known to produce fatigue failures. Another convenient basis for comparison of the adequacy of working strengths of materials is the ratio of modulus of elasticity to the allowable working stress. For steel, assuming a working stress as high as the ratio is 0.0053. For Delrin the ratio is 0.049 or about 10 times that for steel. It has been found that materials having characteristics like these make it possible to provide horseshoes having useful energy storage and release capacities and having weight and size meeting the stated objectives.

Figure 5:
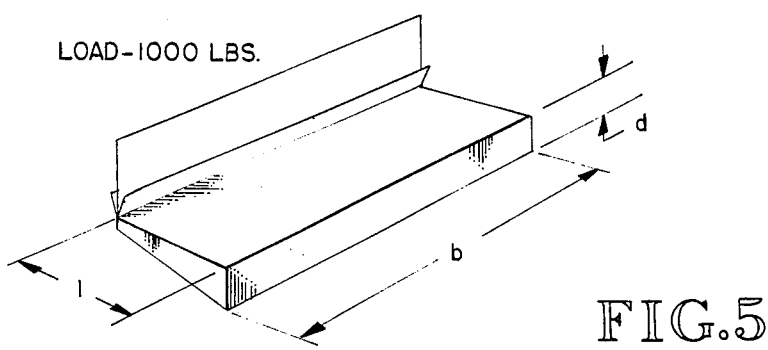
FIG. 5 is a perspective illustration of a spring included for simplified calculations related to characteristics of spring materials.

Calculation of the stresses in the spring configured as described would be highly complicated by its geometry. However, a spring of simple shape having the same basic functional properties as the described spring is useful for purposes of discussing the material suited to the purposes of the spring of the subject invention. The simpler spring is shown in FIG. 5. It is a cantilever spring having a length 1, width b and a thickness d at the fixed end, tapering to near 0 at the free end on which a load P is applied uniformly along the free end. It can be seen that this spring model represents the primary working segment of the spring of the invention indicated by the brackets S and S' in FIG. 4. For purposes of this discussion, the maximum working load P is 1,000 pounds, the width f is 4 inches, the length 1 is 2 inches and the working deflection y is 0.2 of an inch, these dimensions being comparable to those required for the spring of the subject horseshoe to match the size range of horses hooves. In the actual spring the working deflection would be 0.4 of an inch since there are two of the example portions in the actual spring, per side, four all together. With the working load of 1000 pounds per pair, the total working load is in the desired range at 2000 pounds.

The formulae used in the following calculations are for a cantilever beam of uniform strength loaded at the free end. The formulae can be found on page 358 of Kent's Mechanical Engineer's Handbook, published by John Wiley & Sons, tenth edition, copyright 1930.

The formula for calculating stress S is:

$$S = \frac{6P\,l}{b\,d^2};$$

The formula for deflection at the working end is:

$$y = \frac{8P\,l^3}{E\,b\,d^3};$$

E is the modulus of elasticity.

The formula for d, the thickness of the spring at the fixed end is:

$$d = \sqrt[3]{\frac{8P\,l^3}{E\,b\,y}}$$

Substituting this formula for d in the equation for S:

$$S = \frac{6P\,l}{b\left(\sqrt[3]{\frac{8P\,l^3}{E\,b\,y}}\right)^2},$$

Substituting the assigned values for Delrin in this equation:

$$S = \frac{6 \times 1000 \times 2}{4\left(\sqrt[3]{\frac{8 \times 1000 \times 2^3}{350,000 \times 4 \times .2}}\right)^2},$$

and

S=8,021 PSI, the working stress.
To calculate the weight, W:

$$W = \frac{b \times l \times d}{2} \times \text{density}$$

The thickness d at the fixed end is calculated by the formula:

$$d = \sqrt[3]{\frac{8P\,l^3}{E\,b\,y}};$$

using the given dimensions and values for Decrin:

$$d = \sqrt[3]{\frac{8 \times 1000 \times 2^3}{350,000 \times 4 \times .2}}$$
$$= .6115 \text{ inches.}$$

Substituting this value in the formula for weight:

$$W_p = \frac{4 \times 2 \times .229}{2} \times .05 = .046 \text{ pounds} = 1.95 \text{ oz.}$$

For comparison purposes, a similar calculation for steel follows:

$$S = \frac{6 \times 1000 \times 2}{4\left(\sqrt[3]{\frac{8 \times 1000 \times 2^2}{30 \times 10^6 \times 4 \times .2}}\right)^2}$$

S=157,895 PSI
Weight:

$$W_S = \frac{4 \times 2 \times .138}{2} \times .286$$
$$= .158 \text{ pounds} = 2.53 \text{ oz.}$$

It can be recognized from this example that a steel spring, even one capable of a reasonable fatigue life under working stress in the range of 160,000 PSI would be about 1–3 times heavier than a plastic spring working in the upper part of its allowable working stress range.

Developmental work with the subject horseshoe has demonstrated that springs weighing in the range of 8 to 10 ounces meet the requirements of the invention, including the requirement for durability.

The wear plates can be made of aluminum alloy or any other material suited to the purpose such as plastics particularly noted for their toughness and resistance to wear. The wear plates may also include features intended to improve the performance of the horse, such as ribs to improve traction and the like.

It can be concluded from this description that the subject invention meets its stated objectives. The spring in the described embodiment relieves the hoof from shock to the extent that under normal use no significant shock can be experienced unless and until the force on the hoof is in the range of 2000 pounds. The open-ended horseshoe configuration, combined with the low modulus of elasticity of the spring, facilitates but does not depend on the natural shock relief characteristics of horses' hooves. Its weight and height are in the acceptable ranges of weight and height of horseshoes. It can be fitted and attached with conventional, state-of-the-art equipment and techniques. It is durable and also economical to manufacture. Also, qualitative testing shows that the corollary objective of improved performance is achievable.

While a preferred embodiment of the invention is described herein, it will be clear to those skilled in the art that other embodiments and modifications of the one described are possible within the scope of the invention which is limited only by the appended claims.

What is claimed is:

1. A horseshoe comprising a spring fabricated from a material having a modulus of elasticity in the range of 300,000 to 3,000,000 pounds per square inch, a density in the range of 0.03 to 0.07 pounds per cubic inch and an allowable working stress in the range of 15,000 to 22,000 PSI;

and in which said spring is an integral part comprising an upper flange, a lower flange and a channel, said upper flange being configured for attachment to a horse's hoof.

2. The horseshoe of claim 1 further comprising a wear plate attached to said spring.

3. The horseshoe of claim 1 further comprising a wear plate attached to said lower flange.

4. The horseshoe of claim 1 in which said lower flange has cutouts whereby clearance is provided to facilitate said attachment.

5. The horseshoe of claim 4 further comprising a wear plate attached to said lower flange.

6. A horseshoe comprising a spring fabricated from a material having a modulus of elasticity in the range of 350,000 to 500,000 pounds per square inch, a density of 0.04 to 0.06 pounds per cubic inch and an allowable working stress in the range of 16,000 to 18,000 PSI;

and in which said spring is an integral part comprising an upper flange, a lower flange and a channel, said upper flange being configured for attachment to a horse's hoof.

7. The horseshoe of claim 2 further comprising a wear plate attached to said spring.

8. The horseshoe of claim 2 further comprising a wear plate attached to said lower flange.

9. The horseshoe of claim 2 in which said lower flange has cutouts whereby clearance is provided to facilitate said attachment.

10. The horseshoe of claim 9 further comprising a wear plate attached to said lower flange.

11. A horseshoe which is a spring which is an integral part comprising an upper flange, a lower flange and a channel portion interconnecting said upper and lower flanges, said upper flange being configured for attachment to a horse's hoof;

said spring having a weight in the range of 7 to 16 ounces, a deflection limited in the range of 0.3 to 0.6 inches and a maximum load in the range of 1500 to 2500 pounds.

12. The horseshoe of claim 11 in which said lower flange has cutouts whereby clearance is provided to facilitate said attachment.

13. The horseshoe of claim 12 further comprising a wear plate attached to said lower flange.

14. The horseshoe of claim 11 further comprising a wear plate attached to said lower flange.

15. The horseshoe of claims 5, 10, 14 or 13 in which said wear plate has protrusions configured and located to fill said cutouts.

16. The horseshoe of claim 11 in which said weight is in the range of 8 to 11 ounces, said deflection is limited in the range of 0.35 to 0.45 inches and said maximum load is in the range of 1800 to 2200 pounds.

* * * * *